(12) United States Patent
Huang et al.

(10) Patent No.: US 11,460,625 B2
(45) Date of Patent: Oct. 4, 2022

(54) REFLECTIVE DISPLAY APPARATUS AND LIGHT GUIDE MODULE

(71) Applicant: E Ink Holdings Inc., Hsinchu (TW)

(72) Inventors: Hsin-Tao Huang, Hsinchu (TW); Yu-Chuan Wen, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 17/368,849

(22) Filed: Jul. 7, 2021

(65) Prior Publication Data

US 2022/0137283 A1 May 5, 2022

(30) Foreign Application Priority Data

Oct. 30, 2020 (TW) .................................. 109137762

(51) Int. Cl.
*F21V 8/00* (2006.01)

(52) U.S. Cl.
CPC ......... *G02B 6/0055* (2013.01); *G02B 6/0036* (2013.01); *G02B 6/0088* (2013.01); *G02B 6/0093* (2013.01)

(58) Field of Classification Search
CPC ............................. G02B 6/0036; G02B 6/0088
See application file for complete search history.

(56) References Cited

U.S. PATENT DOCUMENTS

| | | | |
|---|---|---|---|
| 7,969,531 B1 | 6/2011 | Li et al. | |
| 9,285,530 B2 | 3/2016 | Neugebauer et al. | |
| 9,417,376 B2 | 8/2016 | Sykora et al. | |
| 9,519,100 B2 | 12/2016 | Chen et al. | |
| 10,527,777 B2 | 1/2020 | Wang et al. | |
| 2010/0259829 A1* | 10/2010 | Kim ..................... | G02B 27/026 359/609 |
| 2011/0025727 A1* | 2/2011 | Li ......................... | G02B 6/0016 362/617 |
| 2013/0063968 A1* | 3/2013 | Neugebauer ......... | G02B 6/0043 362/603 |
| 2013/0063969 A1* | 3/2013 | Neugebauer ......... | G02B 6/0036 362/603 |
| 2016/0223734 A1* | 8/2016 | Hsu ...................... | G02B 6/0018 |
| 2019/0369323 A1 | 12/2019 | Huang et al. | |
| 2021/0356653 A1* | 11/2021 | Zhao ................. | G02F 1/133524 |

FOREIGN PATENT DOCUMENTS

| | | |
|---|---|---|
| TW | 201543118 A | 11/2015 |
| TW | 201831931 A | 9/2018 |
| TW | 201833883 A | 9/2018 |
| TW | 202037982 A | 10/2020 |
| TW | 202102921 A | 1/2021 |

* cited by examiner

Primary Examiner — Keith G. Delahoussaye
(74) Attorney, Agent, or Firm — CKC & Partners Co., LLC

(57) ABSTRACT

A light guide module suitable for being disposed on a reflective display panel includes a light guide plate and a light-shielding part. The light guide plate has a first surface, a second surface opposite to the first surface, and an optical structure formed in the first surface. The first surface has a display area and an edge area surrounding the display area, and the optical structure is distributed in the display area. The light-shielding part is disposed on the first surface and covers the edge area, in which the light-shielding part has an opening exposing the display area.

15 Claims, 6 Drawing Sheets

REFLECTIVE DISPLAY APPARATUS AND LIGHT GUIDE MODULE

CROSS-REFERENCE TO RELATED APPLICATION

This application claims priority to Taiwan Application Serial Number 109137762, filed Oct. 30, 2020, which is herein incorporated by reference in its entirety.

BACKGROUND

Technical Field

The present disclosure relates to a display apparatus. More particularly, the present disclosure relates to a reflective display apparatus and a light guide module thereof.

Description of Related Art

At present, some display apparatuses have a light guide module for guiding light emitted from a light source apiece so that the display apparatus can show a bright image, thereby helping the users to watch, in which most of the display apparatuses use a plurality of light emitting diodes (LEDs) as the light source. Since the LED usually has a directionality characteristic, a light beam emitted from each of the LEDs has a small divergence angle, so that an image with uneven brightness, thereby reducing the image quality of the display apparatus.

SUMMARY

The disclosure according to at least one embodiment provides a light guide module, which can help the light to be emitted uniformly, so as to reduce or avoid the images with uneven brightness.

The disclosure according to at least one embodiment also provides a reflective display apparatus including the above-mentioned light guide module.

A light guide module according to at least one embodiment of this disclosure is suitable for being disposed on the reflective display panel and includes a light guide plate and a light-shielding part. The light guide plate has a first surface, a second surface opposite to the first surface and an optical structure formed in the first surface, in which the first surface has a display area and an edge area surrounding the display area, and the optical structure is distributed in the display area. The light-shielding part is disposed on the first surface and covers the edge area, where the light-shielding part has an opening exposing the display area.

By the above optical structure, the light guide module can help the light of the light emitting components exits from the light guide plate uniformly, so as to reduce or avoid the images with uneven brightness.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1A:
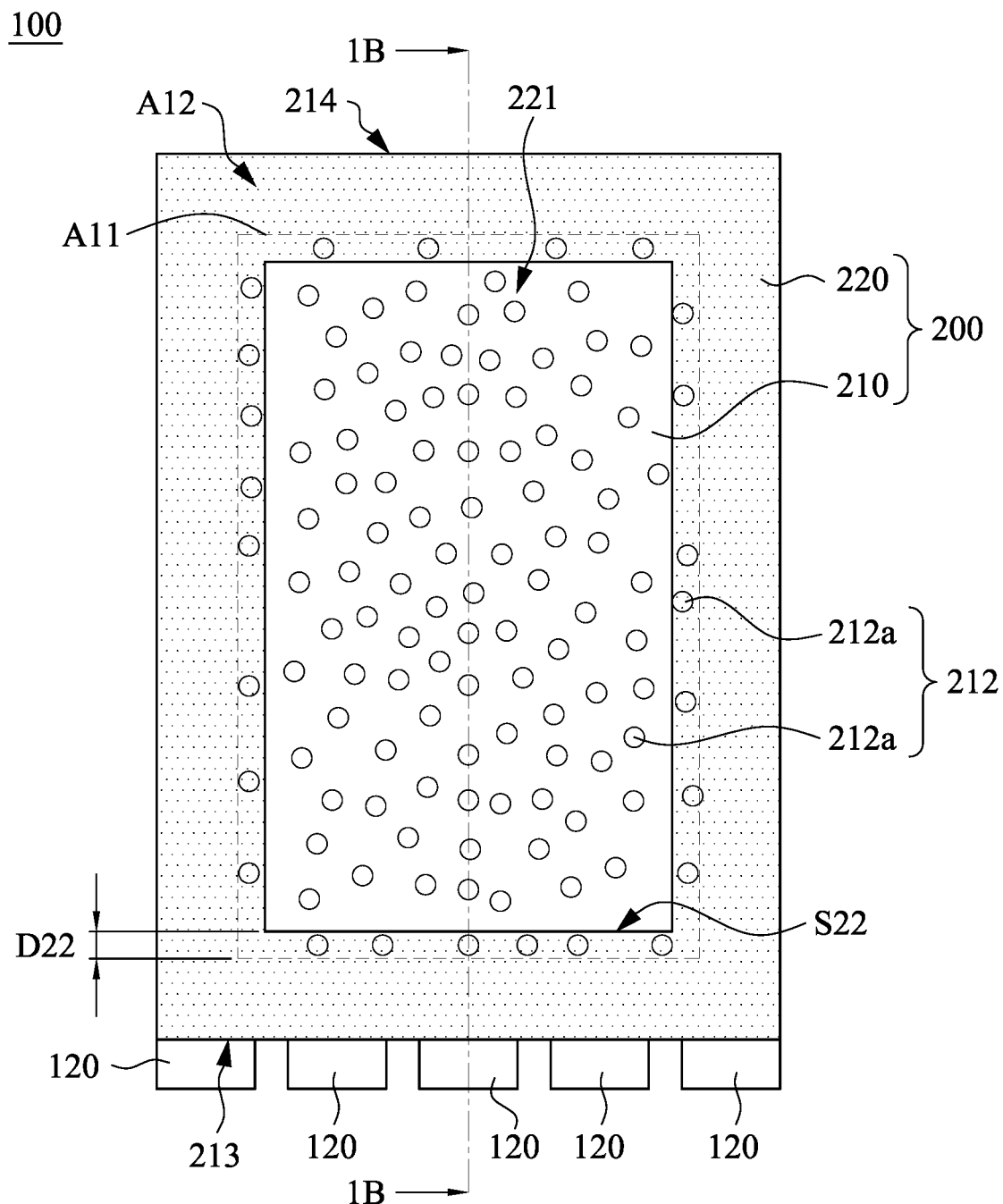
FIG. 1A is a schematic plan view of a reflective display apparatus according to at least one embodiment of this disclosure.

Reference will now be made in detail to the present embodiments of the disclosure, examples of which are illustrated in the accompanying drawings. Wherever possible, the same reference numbers are used in the drawings and the description to refer to the same or like parts.

In the following description, in order to clearly present the technical features of the present disclosure, the dimensions (such as length, width, thickness, and depth) of elements (such as layers, films, substrates, and areas) in the drawings will be enlarged in unusual proportions. Accordingly, the description and explanation of the following embodiments are not limited to the sizes and shapes of the elements presented in the drawings, but should cover the sizes, shapes, and deviations of the two due to actual manufacturing processes and/or tolerances. For example, the flat surface shown in the drawings may have rough and/or non-linear characteristics, and the acute angle shown in the drawings may be round. Therefore, the elements presented in the drawings in this case which are mainly for illustration are intended neither to accurately depict the actual shape of the elements nor to limit the scope of patent applications in this case.

Moreover, the words, such as "about", "approximately", or "substantially", appearing in the present disclosure not only cover the clearly stated values and ranges, but also include permissible deviation ranges as understood by those with ordinary knowledge in the technical field of the invention. The permissible deviation range can be caused by the error generated during the measurement, where the error is caused by such as the limitation of the measurement system or the process conditions. For example, two objects (e.g., the planes or traces of two substrates) are "substantially parallel" or "substantially perpendicular", where "substantially parallel" and "substantially perpendicular" mean that the parallelism and the perpendicularity respectively between the two objects may include non-parallelism and non-perpendicularity due to the permissible deviation.

In addition, "about" may be expressed within one or more standard deviations of the values, such as within ±30%, ±20%, ±10%, or ±5%. The word "about", "approximately" or "substantially" appearing in this text can choose an acceptable deviation range or a standard deviation according to optical properties, etching properties, mechanical properties or other properties, not just one standard deviation to apply all the optical properties, etching properties, mechanical properties and other properties.

Figure 1B:
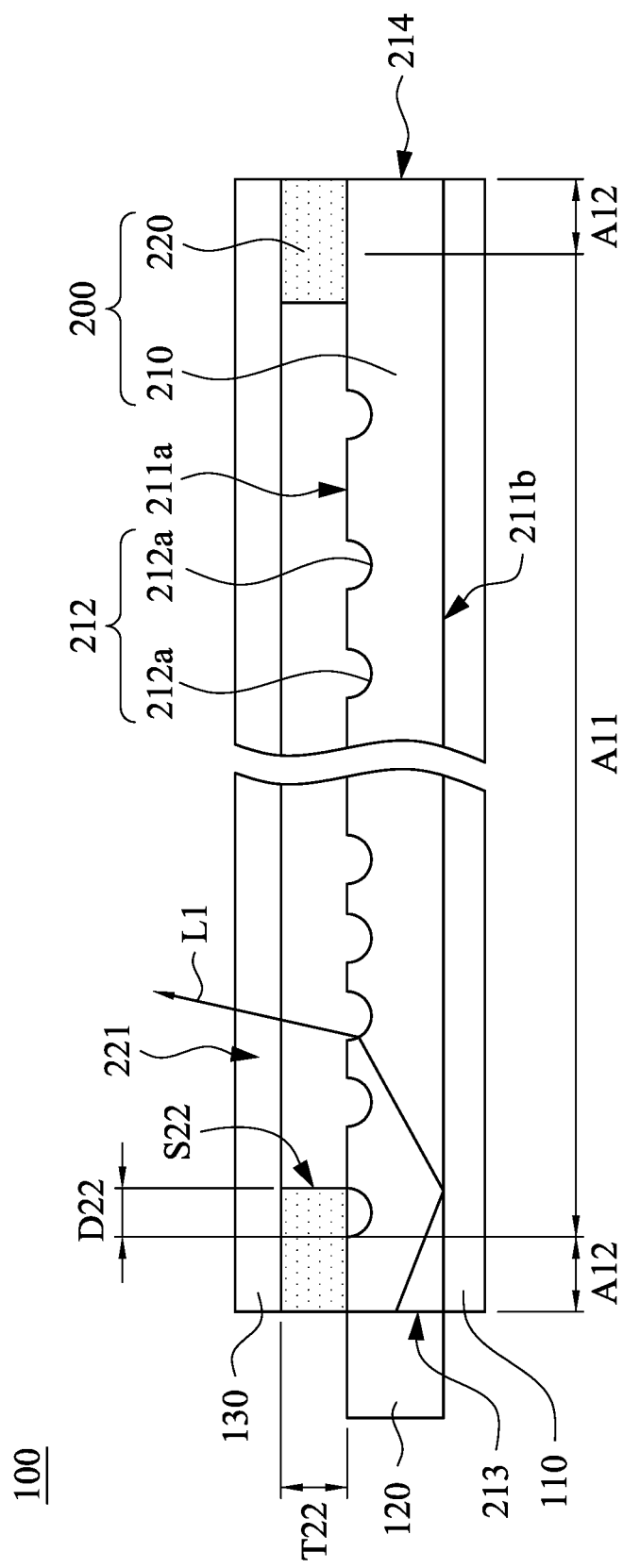
FIG. 1B is a schematic cross-sectional view along a line 1B-1B shown in FIG. 1A.

FIG. 1A is a schematic plan view of a reflective display apparatus according to at least one embodiment of this disclosure, and FIG. 1B is a schematic cross-sectional view along a line 1B-1B shown in FIG. 1A. Referring to FIGS. 1A and 1B, a reflective display apparatus 100 includes a reflective display panel 110, a plurality of light emitting components 120 and a light guide module 200, in which the reflective display panel 110 may be an electrophoretic (EPD) display panel, an electrowetting display panel, or a cholesteric liquid crystal display (ChLCD) panel, and the light emitting components 120 may a LED, for example.

The light guide module 200 can be disposed on the reflective display panel 110, and the light emitting components 120 are disposed at the same side of the light guide module 200, or at different sides on demand. The reflective display panel 110 can be adhered to the light guide module 200 by using an optically clear adhesive (OCA, not shown). Alternatively, the reflective display panel 110 can be attached under the light guide module 200 by other ways.

The light guide module 200 includes a light guide plate 210, in which the light guide plate 210 is a transparent substrate, such as a glass plate or a transparent plastic board. The material of the transparent plastic board can be poly (methyl methacrylate) (PMMA, i.e., Acrylic), polycarbonate (PC), cyclo olefin coplymer (COC) or cyclo olefin polymers (COP).

The light guide plate 210 has a first surface 211a, a second surface 211b opposite to the first surface 211a, and an optical structure 212 formed in the first surface 211a, where the second surface 211b is located between the first surface 211a and the reflective display panel 110. Hence, the optical structure 212 is formed in one side of the light guide plate 210 away from the reflective display panel 110 (i.e., the first surface 211a) and not formed in another side of the light guide plate 210 adjacent to the reflective display panel 110 (i.e., the second surface 211b).

The first surface 211a has a display area A11 and an edge area A12 surrounding the display area A11, in which the edge area A12 is adjacent to the display area A11. FIG. 1A shows the boundary between the edge area A12 and the display area A11 with a dashed frame, in which the display area A11 is located inside the dashed frame, whereas the edge area A12 is located outside the dashed frame. The images generated by the reflective display panel 110 mainly appear in the display area A11, and the optical structure 212 is distributed in the display area 11, not distributed in the edge area A12.

The optical structure 212 may include a plurality of depressions 212a, in which each of the depressions 212a extends from the first surface 211a to the second surface 211b. As seen from FIG. 1B, the depth of each of the depressions 212a is apparently less than the thickness of the light guide plate 210, in which the thickness of the light guide plate 210 is equivalent to the distance between the first surface 211a and the second surface 211b. Hence, each of the depressions 212a is not formed by passing through the light guide plate 210.

In the embodiment, the plan view of each depression 212a in the first surface 211a may take the shape of a circle (as shown in FIG. 1A). However, in other embodiment, the plan view of each depression 212a in the first surface 211a may take the shape of a triangle, a rectangle, a pentagon, a hexagon, or an ellipse. Alternatively, the plan view of the depressions 212a in the first surface 211a may include various geometric shapes, for example, at least two of triangle, rectangle, circle, ellipse, pentagon, and hexagon. In addition, at least one of the depressions 212a may be a trench in the shape of a strip, such as a V-cut.

Moreover, in the embodiment, the depressions 212a can be distributed randomly in the first surface 211a, that is, the depressions 212a can be arranged irregularly, as shown in FIG. 1A. However, in other embodiment, these depressions 212a can be arranged regularly, such as arranged in an array. Thus, the disclosure is illustrated with FIGS. 1A and 1B, for example, and FIGS. 1A and 1B do not limit the shape and the arrangement of the depressions 212a.

The light-shielding part 220 is disposed on the first surface 211a and covers the edge area A12, in which the light-shielding part 220 has an opening 221, and the opening 221 exposes the display area A11. The light-shielding part 220 can be made of ink and have a thin thickness T22, which can range between 5 μm and 20 μm. Accordingly, when a user watches the images generated by the reflective display apparatus 100 at a large viewing angle, it is difficult for the user to find the light-shielding part 220, so as to avoid reducing the image quality of the reflective display apparatus 100 due to the influence of the light-shielding part 220.

Since the optical structure 212 is not distributed in the edge area A12, the light-shielding part 220 basically does not cover the optical structure 212. However, in practice, the light-shielding part 220 perhaps may cover the part of the optical structure 212 adjacent to the edge area A12 due to the influence of process tolerances, that is, the light-shielding part 220 may cover at least one of the depressions 212a. Taking FIGS. 1A and 1B for example, the light-shielding part 220 can cover some of the depressions 212a adjacent to the edge area A12.

The optical structure 212 has an edge covered by the light-shielding part 220, in which the edge is the outer profile of the whole optical structure 212. Taking the embodiment for example, the edge can be equivalent to the edge of the display area A11, i.e., the boundary between the edge area A12 and the display area A1 (as shown by the dashed frame in FIG. 1A). Alternatively, in other embodiment, the abovementioned edge of the optical structure 212 can have the partial edges of the outermost depressions 212a covered by the light-shielding part 220.

The opening 221 of the light-shielding part 220 has a sidewall S22 adjacent to the abovementioned edge (e.g., the boundary between the edge area A12 and the display area A11 in FIG. 1A). Due to the existing process tolerances, the distance D22 between the edge and the sidewall S22 can be controlled to be less than or equal to 1 millimeter (mm), so that the light-shielding part 220 just covers a very small part of the optical structure 212. Hence, the light-shielding part 220 substantially does not cover the optical structure 212.

The light guide plate 210 further has a light incident part 213 and an opposite side 214 opposite to the light incident part 213, where both the light incident part 213 and the opposite side 214 are connected between the first surface 211a and the second surface 211b. In the embodiment, the light incident part 213 and the opposite side 214 can be two opposite side surface of the light guide plate 210 respectively. The light emitting components 120 is disposed at the light incident part 213, in which each of the light emitting components 120 can emit the light L1 to the light incident part 213, so that the light L1 can enter the light guide plate 210 from the light incident part 213.

When the light L1 travels inside the light guide plate 210, the light L1 can be reflected by the reflective display panel 110 on the second surface 211b to the optical structure 212. When the light L1 hits the optical structure 212, the depressions 212a can reduce the total internal reflection of the light L1, thereby causing most of the light L1 to exit from the first surface 211a. In addition, the optical structure 212 also can enable the light L1 emitted by the light emitting components 120 to exit uniformly from the first surface 211a, so as to reduce or avoid the image with uneven brightness, thereby keeping or improving the image quality of the reflective display apparatus 100.

In this embodiment, the reflective display apparatus 100 may further include a protective layer 130, where the protective layer 130 may be a transparent substrate, such as a glass plate or a transparent plastic board, and the material of the transparent plastic board can be PMMA, PC, COC or COP. The protective layer 130 covers the light guide plate 210 of the light guide module 200, so that the light guide module 200 is located between the protective layer 130 and the reflective display panel 110. The protective layer 130 can protect the light guide module 200, thereby prevent both the light guide plate 210 and the light-shielding part 220 from being hit or scratched.

Figure 1C:
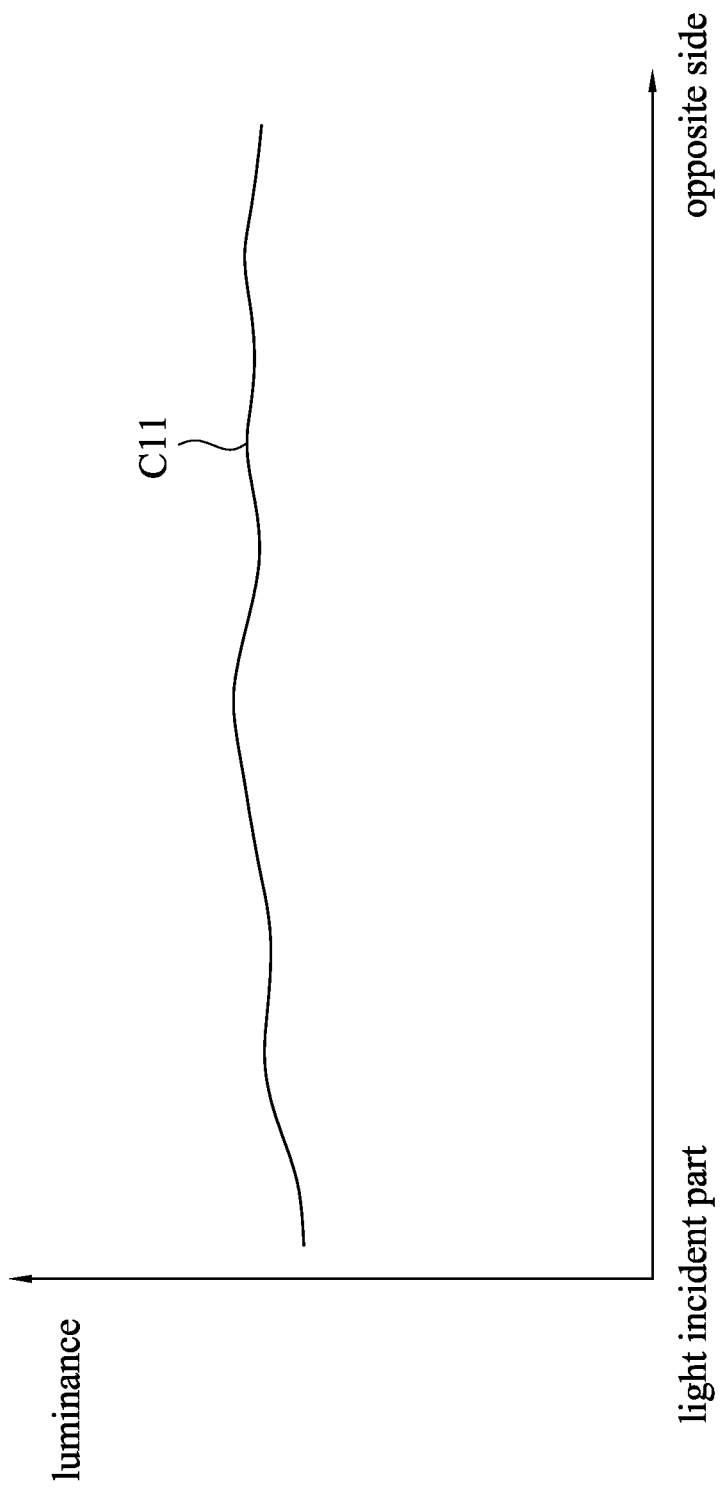
FIG. 1C is a schematic diagram of a luminance distribution of the reflective display apparatus in FIG. 1A.

FIG. 1C is a schematic diagram of a luminance distribution of the reflective display apparatus in FIG. 1A. Referring to FIGS. 1B and 1C, in FIG. 1C, the vertical axis represents the luminance, whereas the horizontal axis represents the positions of the light guide plate 210, where the left end represents the position of the light incident part 213, and the right end represents the position of the opposite side 214. The line C11 represents the luminance distribution of the reflective display apparatus 100 from the light incident part 213 to the opposite side 214. As seen from FIG. 1C, the line C11 does not fluctuate significantly, so that the light L1 emitted from the light emitting components 120 can exit uniformly from the first surface 211a. Accordingly, the images of the reflective display apparatus 100 have even brightness, while no image with uneven brightness appears.

Figure 1D:
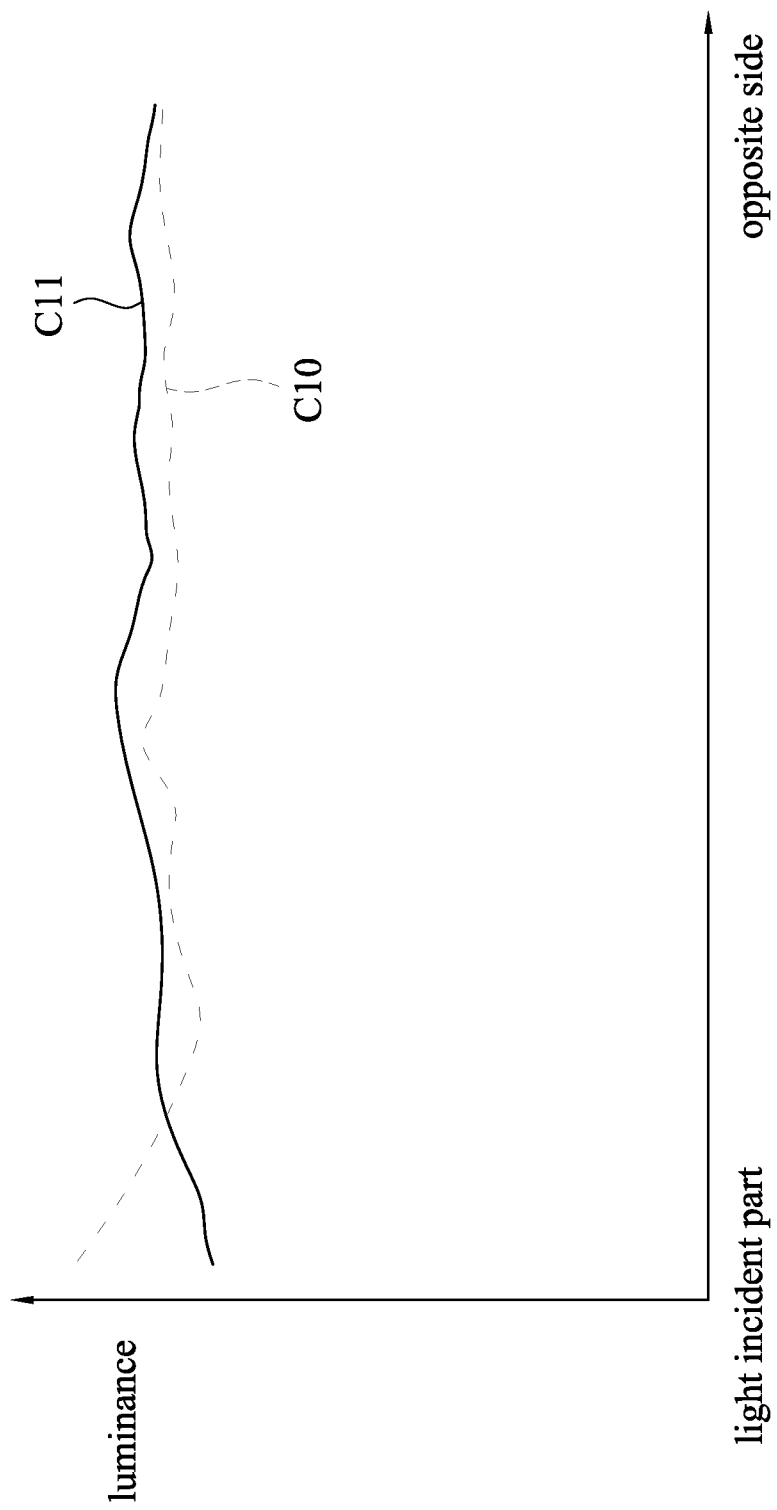
FIG. 1D is a schematic diagram illustrating the comparison of the luminance distributions of both the reflective display apparatus in FIG. 1A and a reference reflective display apparatus.

FIG. 1D is a schematic diagram illustrating the comparison of the luminance distributions of both the reflective display apparatus in FIG. 1A and a reference reflective display apparatus. Referring to FIGS. 1B and 1D, similar to FIG. 1C, in FIG. 1D, the vertical axis represents the luminance, whereas the horizontal axis represents the position of the light guide plate 210, in which the left end represents the position of the light incident part 213, and the right end represents the position of the opposite side 214. The line C10 (represented by a dashed line) represents the luminance distribution of the reference reflective display apparatus, whereas the line C11 represents the luminance distribution of the reflective display apparatus 100.

The reference reflective display apparatus and the reflective display apparatus 100 are similar, and the only difference between them is that the optical structure 212 is not only distributed in the display area A11, but also distributed in the edge area A12 in the reference reflective display apparatus. In other words, the optical structure 212 of the reference reflective display apparatus is distributed in the first surface 211a entirely. In contrast to the reflective display apparatus 100, the light-shielding part 220 of the reference reflective display apparatus covers more optical structure 212, e.g., more depressions 212a.

Regarding the line C10 in FIG. 1D, the reference reflective display apparatus has a significantly high luminance near its light incident part 213, so that a significant bright band can appear near the light incident part 213 of the reference reflective display apparatus, resulting in reducing the image quality. By way of contrast, the luminance of the reflective display apparatus 100 basically keep constant everywhere, that is, the images of the reflective display apparatus 100 have even brightness. Therefore, reducing or avoiding the coverage of the optical structure 212 by the light-shielding part 220 helps to uniformize the brightness of the images generated by the reflective display apparatus 100, so as to keep or improve the image quality of the reflective display apparatus 100.

Figure 2A:
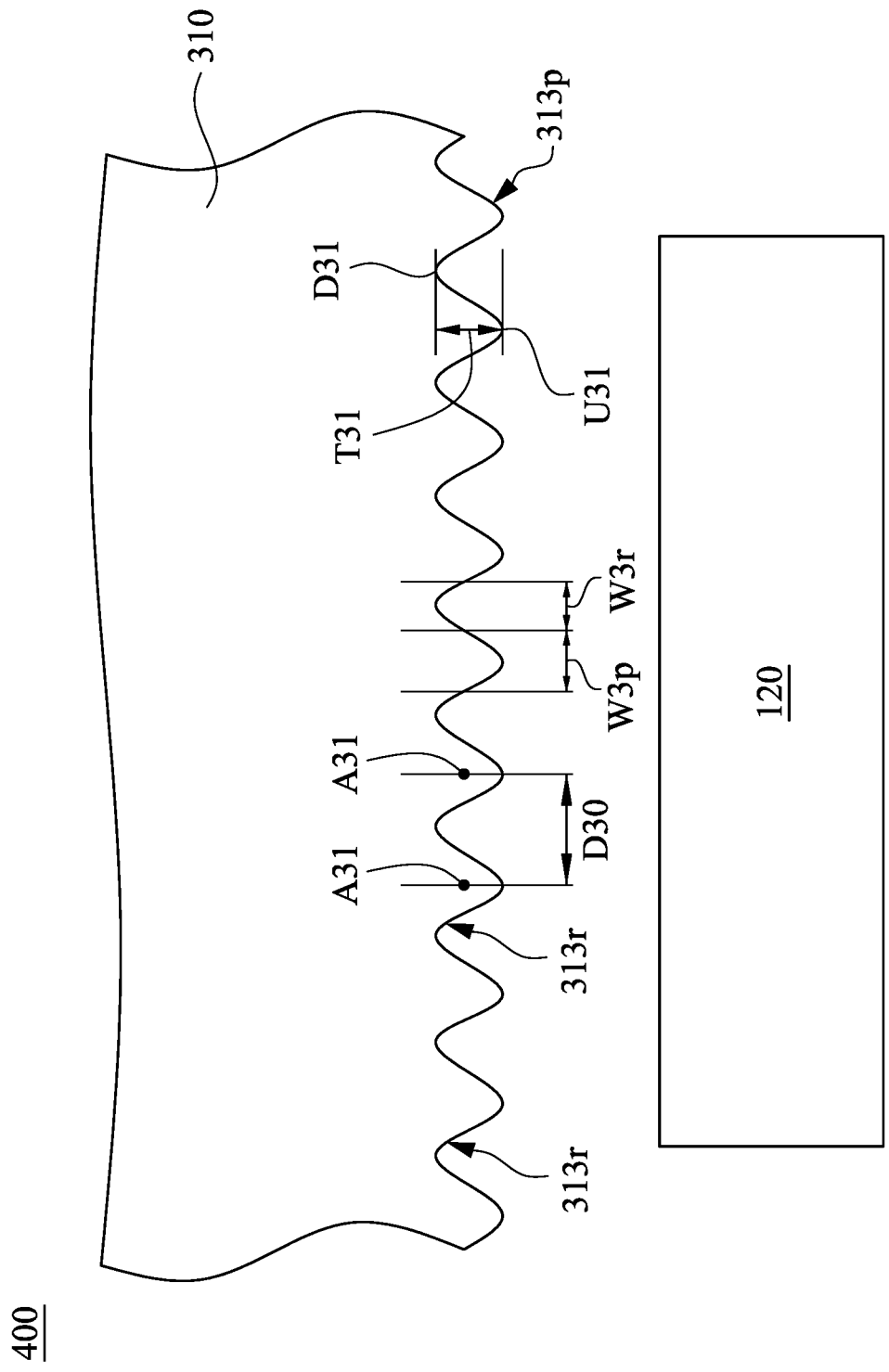
FIG. 2A is a schematic partial top view of a reflective display apparatus according to another embodiment of this disclosure.
Figure 2B:
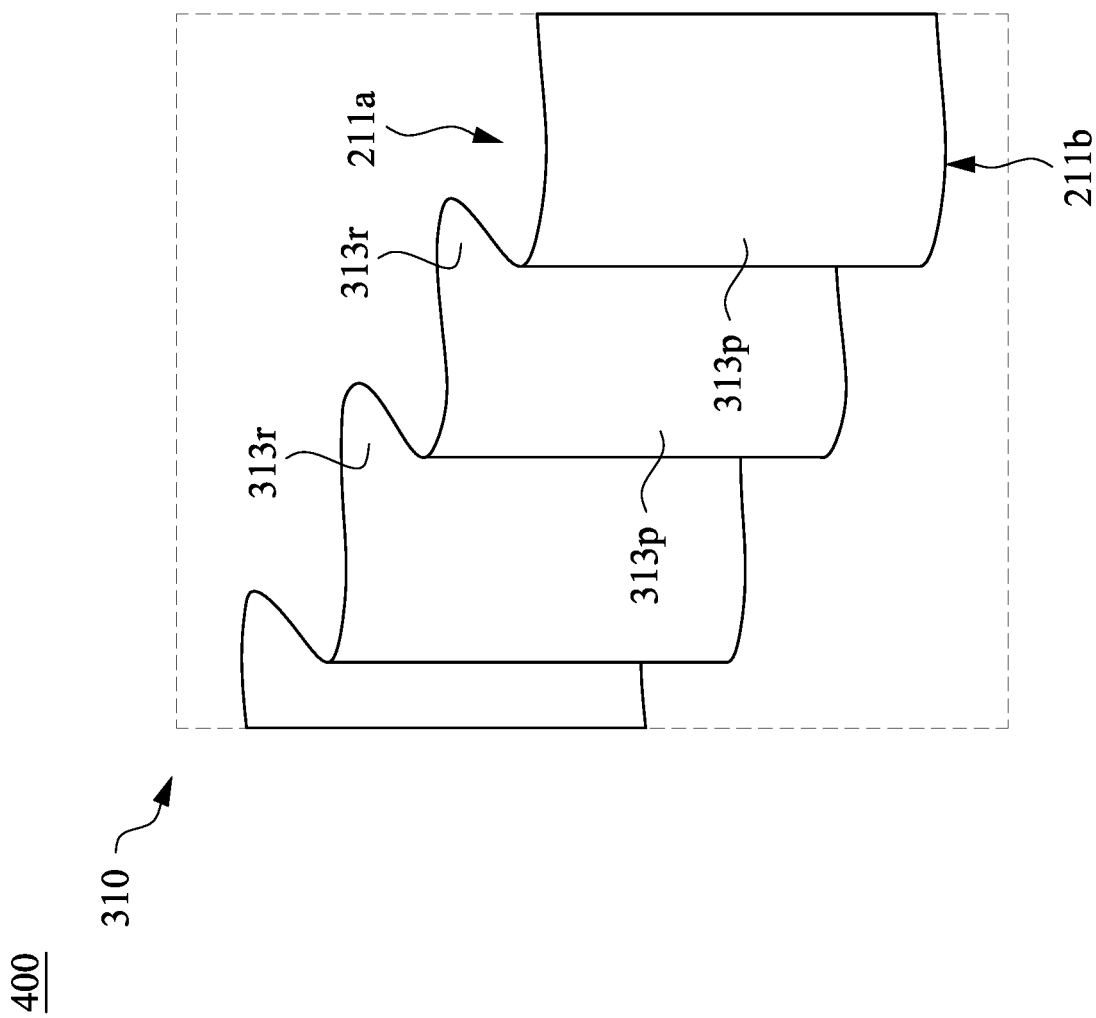
FIG. 2B is a schematic partial perspective view of the light guide plate in FIG. 2A.

FIG. 2A is a schematic partial top view of a reflective display apparatus according to another embodiment of this disclosure, and FIG. 2B is a schematic partial perspective view of the light guide plate in FIG. 2A. Referring to FIGS. 2A and 2B, the reflective display apparatus 400 and the reflective display apparatus 100 are similar. For example, the reflective display apparatus 400 includes a light guide plate 310, and the light guide plate 310 has a first surface 211a, a second surface 211b, an optical structure 212 (not shown in FIGS. 2A and 2B), and a light incident part 313, where the light incident part 313 is connected between the first surface 211a and the second surface 211b, and the light emitting components 120 are disposed at the light incident part 313.

The only difference between the reflective display apparatuses 100 and 400 is that the light incident part 313 is not a plane and has a plurality of convex cylindrical surfaces 313p and a plurality of concave cylindrical surfaces 313r. The convex cylindrical surface 313p and the concave cylindrical surface 313r are arranged alternately, so that the convex cylindrical surface 313p and the concave cylindrical surface 313r become a wave surface, in which the convex cylindrical surface 313p and the concave cylindrical surface 313r may be arranged along the edges of both the first surface 211a and the second surface 211b. Taking FIG. 2A for example, the convex cylindrical surface 313p and the concave cylindrical surface 313r arranged alternately become a curved surface in the shape of a sine wave, where the width W3p of each of the convex cylindrical surfaces 313p is equal to the width W3r of each of the concave cylindrical surfaces 313r, and a distance D30 between two axes of two adjacent convex cylindrical surfaces can range between 35 μm and 70 μm.

In addition, each of the convex cylindrical surfaces 313p has a crest part U31, whereas each of the concave cylindrical surfaces 313r has a through part D31, in which the light incident part 313 has a thickness T31 between the crest part U31 and the through part D31, and the thickness T31 can range between 5 μm and 35 μm. By the convex cylindrical surfaces 313p and the concave cylindrical surfaces 313r, the light incident part 313 can diverge the light emitted from the light emitting components 120, so as to reduce or avoid the images with uneven brightness, thereby keeping or improving the image quality of the reflective display apparatus 400.

Consequently, by the abovementioned optical structure, the light guide module according to at least one embodiment of the disclosure can help the light of the light emitting components to exit uniformly from the first surface of the light guide plate, so as to reduce or avoid the images with uneven brightness, thereby improving the image quality of the reflective display apparatus.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A light guide module disposed on a reflective display panel, the light guide module comprising:
   a light guide plate, having a first surface, a second surface opposite to the first surface and an optical structure formed in the first surface, wherein the first surface has a display area and an edge area surrounding the display area, and the optical structure is distributed in the display area; and
   a light-shielding part, disposed on the first surface and covering the edge area, wherein the light-shielding part has an opening exposing the display area, and the optical structure formed in the first surface of the light guide plate is exposed by the opening of the light-shielding part,
   wherein the optical structure is not distributed in the edge area, and the light-shielding part further covers a part of the optical structure adjacent to the edge area,
   wherein the optical structure has an edge covered by the light-shielding part, and the opening has a sidewall adjacent to the edge, wherein a distance between the edge and the sidewall is less than or equal to 1 millimeter.

2. The light guide module of claim 1, wherein the optical structure comprises a plurality of depressions, and each of the depressions extends in a direction from the first surface to the second surface.

3. The light guide module of claim 1, wherein a thickness of the light-shielding part ranges between 5 μm and 20 μm.

4. The light guide module of claim 1, wherein the light guide plate further has:
   a light incident part, connected between the first surface and the second surface, and having a plurality of convex cylindrical surfaces and a plurality of concave cylindrical surfaces, wherein the convex cylindrical surfaces and the concave cylindrical surfaces are arranged alternately.

5. The light guide module of claim 4, wherein a width of each of the convex cylindrical surfaces is equal to a width of each of the concave cylindrical surfaces.

6. The light guide module of claim 4, wherein a distance between two axes of two adjacent convex cylindrical surfaces ranges between 35 μm and 70 μm.

7. The light guide module of claim 4, wherein each of the convex cylindrical surfaces has a crest part, whereas each of the concave cylindrical surfaces has a through part,
   wherein the light incident part has a thickness between the crest part and the through part ranging between 5 μm and 35 μm.

8. A reflective display apparatus, comprising:
   a reflective display panel;
   a light guide module disposed on the reflective display panel, the light guide module comprising:
      a light guide plate, having a first surface, a second surface opposite to the first surface, an optical structure formed in the first surface and a light incident part connected between the first surface and the second surface, wherein the first surface has a display area and an edge area surrounding the display area, and the optical structure is distributed in the display area, whereas the second surface is located between the first surface and the reflective display panel; and
      a light-shielding part, disposed on the first surface and covering the edge area, wherein the light-shielding part has an opening exposing the display area, and the optical structure formed in the first surface of the light guide plate is exposed by the opening of the light-shielding part; and
      a plurality of light emitting components, disposed at the light incident part, wherein each of the light emitting components is used for emitting light to the light incident part,
   wherein the optical structure is not distributed in the edge area, and the light-shielding part further covers a part of the optical structure adjacent to the edge area,
   wherein the optical structure has an edge covered by the light-shielding part, and the opening has a sidewall adjacent to the edge, wherein a distance between the edge and the sidewall is less than or equal to 1 millimeter.

9. The reflective display apparatus of claim 8, wherein the optical structure comprises a plurality of depressions, and each of the depressions extends in a direction from the first surface to the second surface.

10. The reflective display apparatus of claim 8, wherein a thickness of the light-shielding part ranges between 5 μm and 20 μm.

11. The reflective display apparatus of claim 8, wherein the light incident part has a plurality of convex cylindrical surfaces and a plurality of concave cylindrical surfaces, wherein the convex cylindrical surfaces and the concave cylindrical surfaces are arranged alternately.

12. The reflective display apparatus of claim 11, wherein a width of each of the convex cylindrical surfaces is equal to a width of each of the concave cylindrical surfaces.

13. The reflective display apparatus of claim 11, wherein a distance between two axes of two adjacent convex cylindrical surfaces ranges between 35 μm and 70 μm.

14. The reflective display apparatus of claim 11, wherein each of the convex cylindrical surfaces has a crest part, whereas each of the concave cylindrical surfaces has a through part,
   wherein the light incident part has a thickness between the crest part and the through part ranging between 5 μm and 35 μm.

15. The reflective display apparatus of claim 8, further comprising a protective layer, wherein the protective layer covers the light guide module, and the light guide module is located between the protective layer and the reflective display panel.

* * * * *